MEANS FOR OPERATING A FIRE EXTINGUISHER

Original Filed Dec. 24, 1959 4 Sheets-Sheet 1

INVENTOR.
ROBERT J. ZELLNER
BY Joseph Rosman
ATTY.

MEANS FOR OPERATING A FIRE EXTINGUISHER

Original Filed Dec. 24, 1959 4 Sheets-Sheet 2

INVENTOR.
ROBERT J. ZELLNER
BY Joseph Ramon
ATTY.

MEANS FOR OPERATING A FIRE EXTINGUISHER

Original Filed Dec. 24, 1959 4 Sheets-Sheet 3

INVENTOR.
ROBERT J. ZELLNER
BY Joseph Rosman
ATTY.

MEANS FOR OPERATING A FIRE EXTINGUISHER

Original Filed Dec. 24, 1959 4 Sheets-Sheet 4

INVENTOR.
ROBERT J. ZELLNER
BY Joseph Rosman
ATTY.

United States Patent Office

Re. 25,844
Reissued Aug. 31, 1965

25,844
MEANS FOR OPERATING A FIRE EXTINGUISHER

Robert J. Zellner, Wilmette, Ill., assignor to The Ansul Company, a corporation of Wisconsin Original No. 3,088,522, dated May 7, 1963, Ser. No. 861,916, Dec. 24, 1959. Application for reissue Sept. 24, 1964, Ser. No. 410,340
4 Claims. (Cl. 169—31)

Matter enclosed in heavy brackets [ ] appears in the original patent but forms no part of this reissue specification; matter printed in italics indicates the additions made by reissue.

This invention relates generally to fire extinguishers and more particularly to portable, stored pressure dry chemical type extinguishers.

The usual type of stored pressure extinguisher comprises an extinguisher shell which contains the dry chemical extinguishing agent and air or some other gas under pressure for expelling the dry chemical agent. Thus, the extinguisher is under pressure at all times and gas leakage is a problem. In almost every case, discharge of such an extinguisher is initiated and controlled by one hand from a valve arranged in conjunction with the carrying handle on top of the extinguisher and the dry chemical stream is directed by a hose held in the other hand. This type of construction has been employed because it minimizes leakage possibilities even though it may not allow most effective use of the extinguishing agent.

Two-handed operation, that is, controlling the rate of flow of the dry chemical with one hand while directing the stream toward the fire with the other, oftentimes requires a degree of coordination not exhibited by an inexperienced operator in the excitement of extinguishing a fire. This type of construction also requires the hand which is bearing the total weight of the extinguisher to control the flow of the extinguishing agent. Under these circumstances, if the operator is not particularly careful, his grip will relax due to the weight of the extinguished which results in unintentional and undesirable throttling of the extinguishing agent flow.

In the cartridge type extinguisher, leakage is not a serious problem since pressure is not applied to the interior of the dry chemical containing vessel until just prior to discharge. Consequently, a type of construction has been adopted which allows nearly optimum operation during fire extinguishment and this type extinguisher almost universally employs a valve at the end of the hose to control the rate of flow of extinguishing agent so that only one hand both directs the stream and controls its rate of flow.

One-handed operation of an extinguisher permits the extinguisher to be carried by a shoulder strap and be operated from an awkward position, such as on a ladder. In cases where the fire is fed by fuel escaping under pressure, if the extinguisher can be controlled and directed with one hand, it is oftentimes possible to play the extinguishing agent on the flames with one hand while operating a valve to cut off the flow of fuel with the other.

Stored pressure type extinguishers generally are not suitably leak resistant for prolonged storage unless the valve seals are kept clear of dry chemical. This can be done by the pressurizing gas during the pressurizing operation after the extinguisher has been filled with agent. However, if this type of extinguisher is partially discharged and then replaced without being repressurized, the valve seats are contaminated with dry chemical, a leaky seal results and the extinguisher cannot be relied upon for satisfactory operation when next needed. This is a very real problem with present stored pressure units, since a fire frequently can be extinguished with so little agent that the pressure remaining is in the range indicated as "operable" by the gauge.

It is therefore the object of this invention to provide a stored pressure type extinguisher which, while maintaining all the leak resistant features of the prior art devices, provides for more efficient fire extinguishment by enabling the rate of discharge to be controlled with the one hand which directs the stream towards the fire.

A further object of this invention is to devise a stored pressure type extinguisher which, having once been used, and not replaced in condition for satisfactory prolonged storage, will automatically indicate this fact by more than an indicated reduction in pressure.

The objects of this invention are obtained by providing a stored pressure extinguisher in which the valve sealing the extinguisher in the usual fashion automatically latches in the open position upon actuation. From this point on, operation of the extinguisher during fire extinguishment is similar to the standard cartridge type extinguisher in which the fire extinguishing stream is directed and controlled with the valved nozzle by a one-hand operation. The latched position of the lever that operates the sealing valve clearly indicates that the extinguisher has been used.

The valve so latched is arranged so it cannot be restored to its initial sealing position until all pressure within the extinguisher has been vented. After being returned to its sealing position, the extinguisher is repressurized, which process frees the sealing valve of dry chemical and enables a reliable seal again to be obtained. This procedure of reducing the pressure to zero after each discharge also serves as a check on the pressure gauge operation. These gauges on occasion become plugged or inoperative through accidents.

Further details and advantages of the invention will be apparent from the following description and accompanying drawings, wherein.

Figure 1:
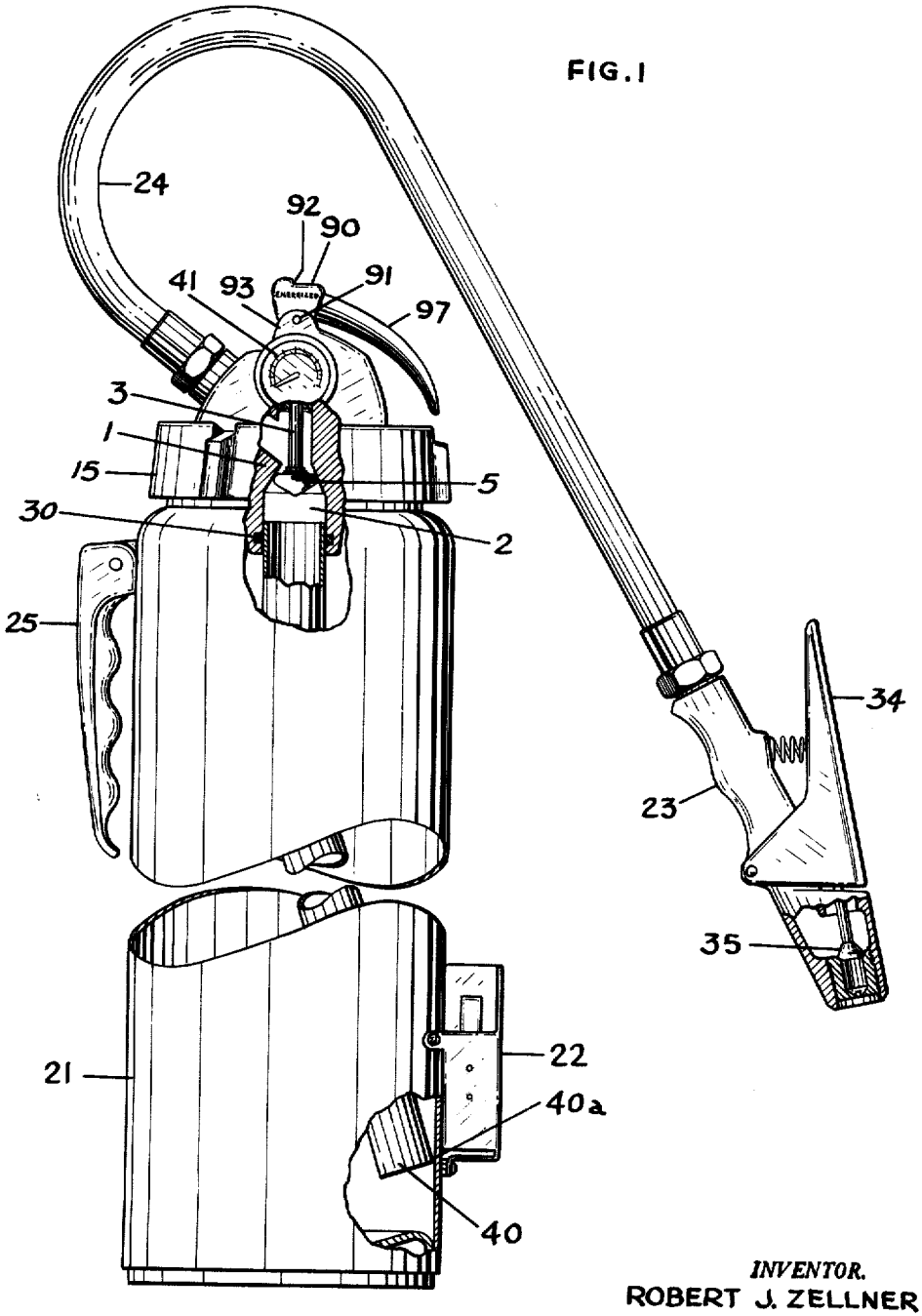
FIGURE 1 is an elevational view of the fire extinguisher construction, partly broken and partly in section.

Referring to the drawings, FIGURE 1 illustrates a fire extinguishing apparatus comprising a steel cylindrical shell or receptacle 21 in which is storage a fire extinguishing agent. The container is adapted to be closed by a head assembly 1 secured in place with a union ring 15. The head assembly has a bore 2 which is sealed by a valve body 5 which is actuated by a plunger 3 cooperating with the cam 90. A riser tube 40, welded to the extinguisher shell at its lower end **40*a* is provided to convey the dry chemical to the head assembly and is maintained in pressure-tight engagement therewith by the O-ring 30. A flexible hose 24 is suitable connected to the head assembly by the conventional threaded coupling 26 and the hose is provided at its free end with a nozzle 23 provided with a valve 35 which is actuated by the lever 34. When not in use, the nozzle 23 is removably retained by the nozzle holster 22 fixed to the shell 21. The pressure within the extinguisher shell is displayed on the pressure gauge 41 which is in communication with the interior of the shell by suitable passageways. The carrying handle 25** is suitably attached to the extinguisher shell.

Figure 2:
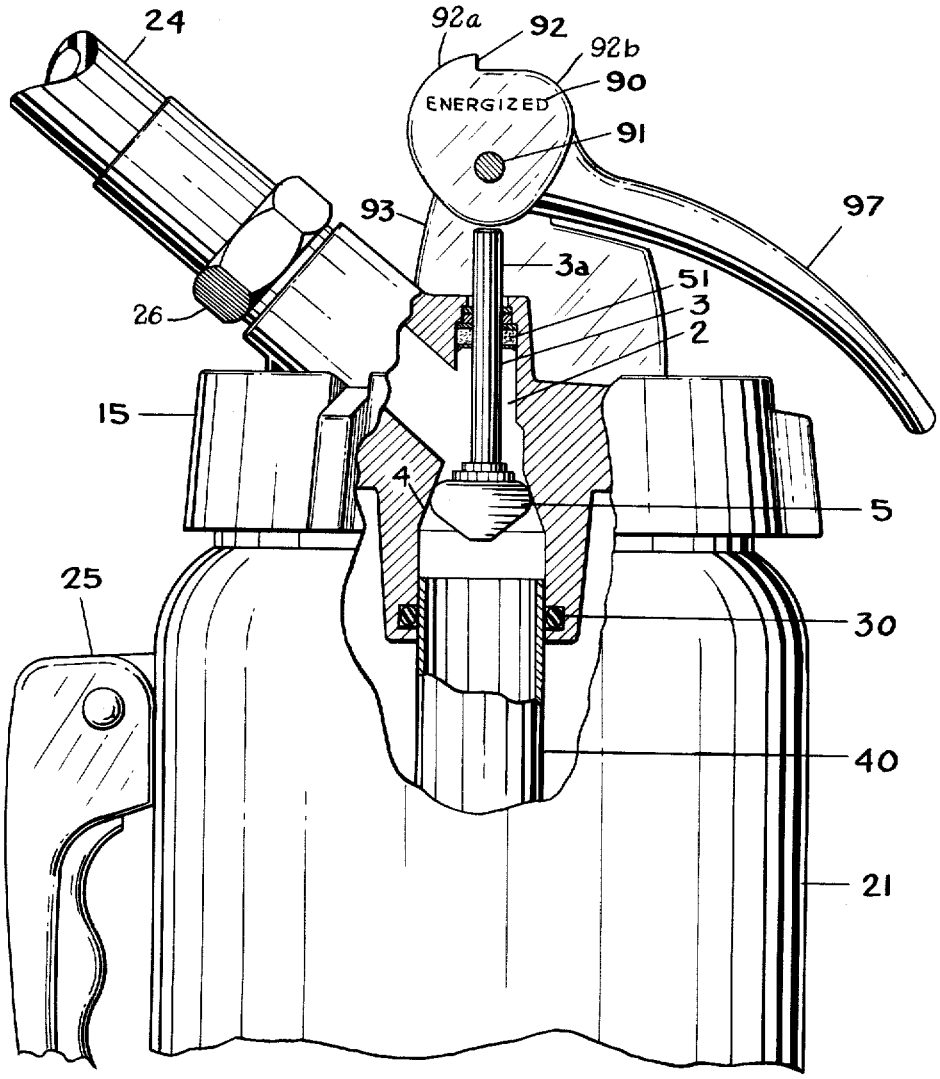
FIGURE 2 is a sectional view of the fire extinguisher head assembly with the parts positioned as they appear during storage of the extinguisher.

As shown in FIGURE 2, the fire extinguisher head 1 has an internal bore 2 designed to accommodate an axially movable plunger 3. A cam 90, [having a notch 92, pivots on the shaft 91 which is supported in the cam] *having a first working surface 92a a second working surface 92b and a third working surface or notch 92 which abruptly departs from the first working surface 92a and merges with a second working surface 92b, pivots on the shaft 91 which is supported in the cam* support 93. The cam is operated by the lever 97. The upper end of the plunger 3a engages and follows the working surfaces of the cam. Leakage around the plunger is prevented by sealing washers 51. The lower end of the plunger is fitted with a valve body 5 which seals against the valve seat 4.

Figure 3:
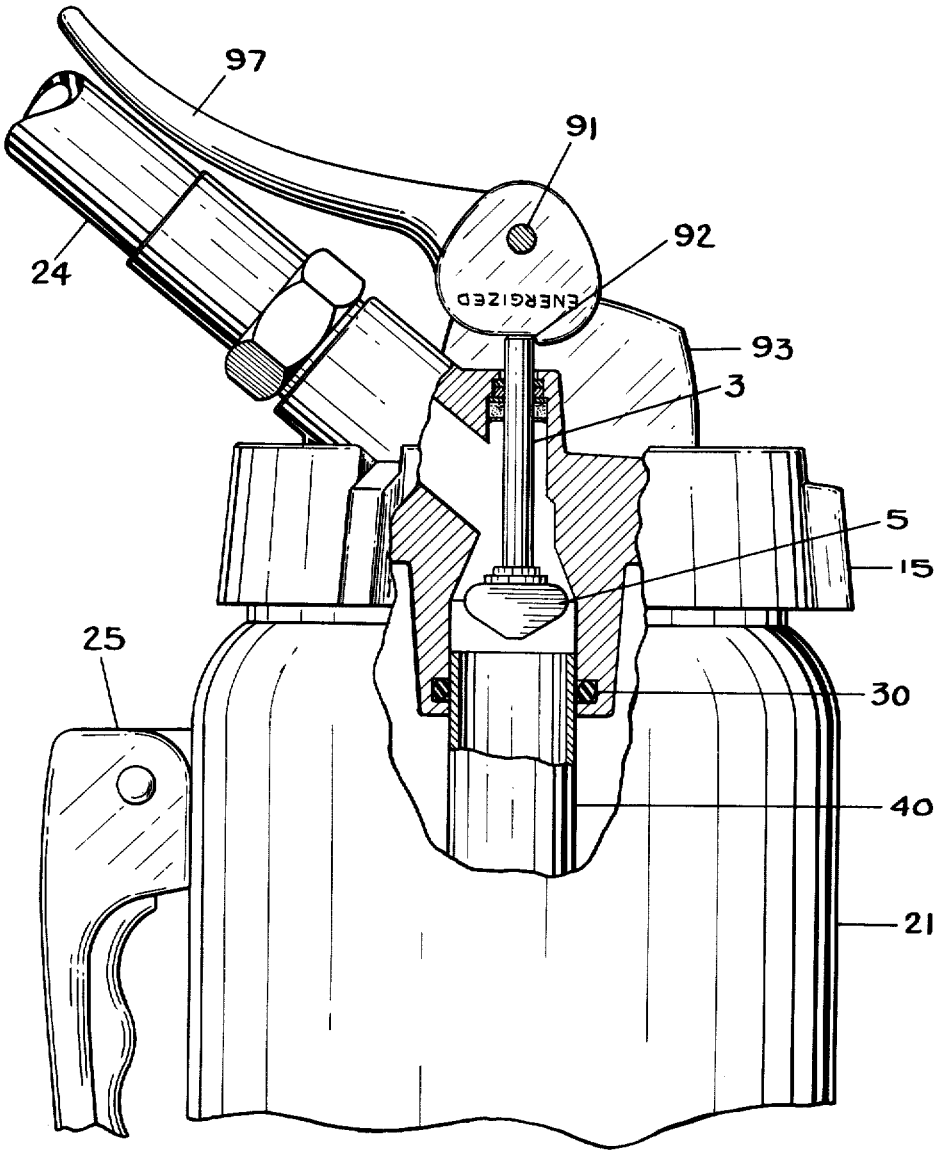
FIGURE 3 is a sectional view of the head assembly with the parts positioned as they are during discharge.

To place the extinguisher in operation, the operating lever 97 is lifted from the position shown in FIGURE 2 and moved in a counterclockwise direction to the position shown in FIGURE 3, thereby causing the cam 90 to depress the plunger 3 which opens the valve 5. When the *first working surface 92a and* the operating lever 97 has been moved to the position shown in FIGURE 3, beyond which it cannot be moved because of the presence of the hose 24, pressure within the extinguisher forces the plunger 3 upwards to engage the notch *or third surface* 92 in the cam. This prevents the operating lever being returned to its initial position and thus the valve, the operating lever and the plunger are locked in the *desired* open position as long as substantial pressure remains in the extinguisher.

With the elements of the head assembly so positioned, the discharge of the extinguishing agent is controlled by means of the second valve 35 located adjacent to the free end of the applicator hose 24.

Figure 4:
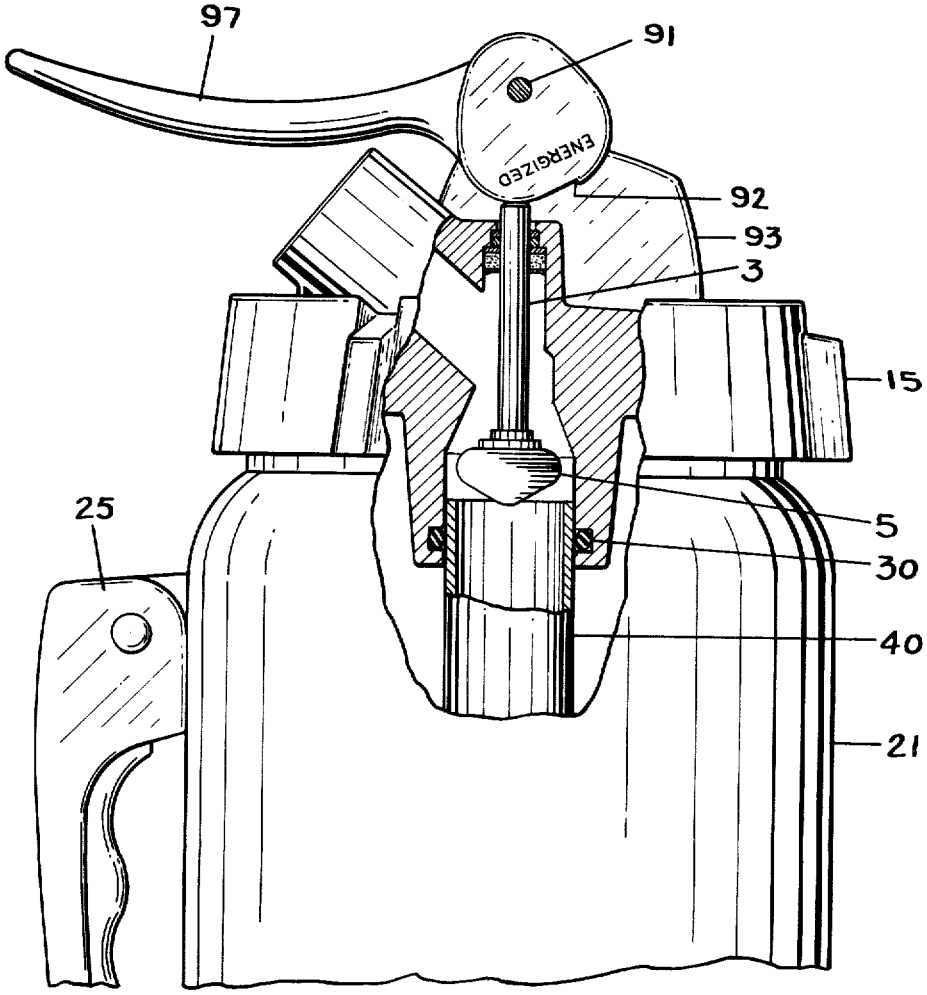
FIGURE 4 is a sectional view of the head assembly with the parts positioned to enable the actuating lever to be returned to its original position for storage.

In order to replace the extinguisher in a stored position, the operating lever 97 must first be moved to the position shown in FIGURE 4 which necessitates removal of the hose 24 by unscrewing the conventional threaded coupling 26. This removal of the hose reduces the pressure in the extinguisher to zero, in the event it has not been totally discharged in extinguishing the fire. Moving the operating lever 97 to the position shown in FIGURE 4 causes the plunger 3 to be sufficiently depressed *by second working surface 92b* so that when the operating lever is rotated in a clockwise direction the notch *or third surface* 92 no longer engages the upper end of the plunger.

Another feature made possible by this extinguisher head construction is placement of the notation "charged" or "energized" on the side of the cam. When the operating lever is moved to open the valve, this notation disappears into and is hidden by the cam support 93, giving another indication that the extinguisher has at least been activated from its stored position.

The present construction may, of course, be applied to various types of extinguishing equipment besides the dry chemical type. It is therefore to be understood that changes and modifications may be made in the construction described which are intended to be included in the appended claims.

I claim:

1. A fire extinguisher discharge apparatus comprising: a container having fire extinguisher agent under pressure, a head having a bore therein at one end of said container, a discharge passage in said head, a hose removably connected to said discharge passage, sealing means in said bore, an axially movable plunger attached to said sealing means, a cam located adjacent one end of said plunger and having a first working surface and a second working surface, a third surface on said cam which abruptly departs from said first surface and merges with said second surface, a lever connected to said cam for rotating said cam whereby said sealing means is moved to an open position by said first working surface engaging and moving said plunger and said sealing means can then be moved by pressure in the container into a desired open position in which position said one end of said plunger engages said third surface, said lever being located with respect to said hose so that a portion of said lever is adapted to engage said hose after said sealing means has been moved to the desired open position to thereby prevent movement of said cam with respect to said plunger, said second surface being adapted to engage said plunger upon rotation of said arm to disengage said plunger and said third working surface whereby said cam can be returned to its original position.

2. A fire extinguisher apparatus comprising a container having a fire extinguisher agent under pressure, a head having a bore therein at one end of said container, a discharge passage in said head, a hose connected to said discharge passage, sealing means in said bore, an axially movable plunger adapted to move said sealing means, a cam located on said head adjacent one end of said plunger, said cam having a first working surface and a second working surface, a third surface on said cam which abruptly departs from said first surface and merges with said second surface, a lever connected to said cam for rotating said cam whereby said sealing means is moved to an open position by said first working surface engaging and moving said plunger and sealing means can be moved by pressure within the container into a desired open position in which position said one end of said plunger engages said third surface, said lever being positioned with respect to said hose so that a portion of said lever is adapted to abut said hose after said sealing means is in the desired open position to thereby prevent disengagement of said plunger from said third surface and movement of said cam with respect to said plunger, and means for permitting removal of said hose from said discharge passage so that said plunger and said third surface can be disengaged by said second surface upon rotation of said cam.

3. A fire extinguisher apparatus comprising: a container for storing a pressurized fire extinguisher agent, a removable head for sealing one end of said container, said head having a bore communicating with said container and a discharge passage, a discharge conduit having one end removably fixed to said discharge passage for conveying fire extinguisher agent, sealing means including a plunger in said bore for normally sealing the pressurized fire extinguisher agent within said container, operating means including a lever adjacent said plunger, said operating means including a first surface and a second surface, a third surface intermediate said first and second surfaces and abruptly departing from said first surface and merging with said second surface, said lever adapted to move said first surface into engagement with said plunger to move said sealing means to an open position whereby pressure within said container moves said plunger into engagement with said third surface whereby said sealing means is in a desired open position, said lever being positioned adjacent said discharge conduit and adapted to engage a porton of said discharge conduit to prevent further movement of said sealing means after it has reached the desired open position until such discharge conduit is removed, said second surface being adapted to engage said plunger upon movement of said lever after removal of said conduit to disengage said plunger and said third working surface.

4. A fire extinguisher apparatus comprising: a container for storing a pressurized fire extinguisher agent, a removable head at one end of said container for sealing said container, a discharge passage in said head, a hose connected to said discharge passage, sealing means in said bore, an axially movable plunger adapted to move said sealing means, a cam rotatably mounted on said head, said cam having a first working surface and a second working surface, a third surface which abruptly departs from said first surface and merges with said second surface, a lever integral with said cam for rotating said cam whereby said sealing means is moved to an open position and can thereafter be moved by pressure within the container into a desired open position in which position said one end of said plunger engages said third surface, said lever being positioned with respect to said hose so that said lever is adapted to abut said hose when said sealing means is in the desired open position to thereby prevent disengagement of said plunger and said third surface, means for permitting removal of said hose from said discharge passage, said cam being rotated after removal of said hose so that said second surface engages said plunger to disengage said one end of said plunger and said third surface whereby said cam can be returned to its original position.

References Cited by the Examiner

The following references, cited by the Examiner, are of record in the patented file of this patent or the original patent.

UNITED STATES PATENTS

| | | |
|---|---|---|
| 2,674,326 | 4/54 | Siebens. |
| 2,708,482 | 5/55 | Nurkiewicz. |
| 2,827,122 | 3/58 | Clark. |
| 2,926,731 | 3/60 | Bowman et al. |

FOREIGN PATENTS

| | | |
|---|---|---|
| 549,300 | 11/57 | Canada. |
| 475,732 | 6/15 | France. |
| 1,193,109 | 10/59 | France. |
| 363,235 | 12/31 | Great Britain. |
| 817,394 | 7/59 | Great Britain. |

M. HENSON WOOD, JR., *Primary Examiner.*

EVERETT W. KIRBY, *Examiner.*